(12) United States Patent
Chi

(10) Patent No.: US 10,618,347 B2
(45) Date of Patent: Apr. 14, 2020

(54) FILM THREE-DIMENSIONAL MESH FABRIC AND ITS MANUFACTURING METHOD

(71) Applicant: GIANT KNITTING CO., LTD., Taichung (TW)

(72) Inventor: Ya-Ling Chi, Taichung (TW)

(73) Assignee: GIANT KNITTING CO., LTD., Taichung (TW)

( * ) Notice: Subject to any disclaimer, the term of this patent is extended or adjusted under 35 U.S.C. 154(b) by 128 days.

(21) Appl. No.: 15/706,491

(22) Filed: Sep. 15, 2017

(65) Prior Publication Data
US 2019/0054763 A1 Feb. 21, 2019

(30) Foreign Application Priority Data

Aug. 17, 2017 (TW) .............................. 106127938 A

(51) Int. Cl.
| | |
|---|---|
| *B44F 1/02* | (2006.01) |
| *B29C 43/22* | (2006.01) |
| *B29D 28/00* | (2006.01) |
| *D06N 7/00* | (2006.01) |
| *B32B 27/12* | (2006.01) |
| *B32B 38/00* | (2006.01) |
| *D06N 3/00* | (2006.01) |

(52) U.S. Cl.
CPC .............. *B44F 1/02* (2013.01); *B29C 43/222* (2013.01); *B29D 28/00* (2013.01); *B32B 27/12* (2013.01); *B32B 38/004* (2013.01); *D06N 3/0077* (2013.01); *D06N 7/0092* (2013.01)

(58) Field of Classification Search
CPC ....................................................... B44F 1/02
See application file for complete search history.

(56) References Cited

U.S. PATENT DOCUMENTS

2016/0312389 A1* 10/2016 Jang ........................ B32B 5/024

* cited by examiner

*Primary Examiner* — Daniel H Lee
(74) *Attorney, Agent, or Firm* — Sinorica, LLC

(57) ABSTRACT

A method of manufacturing a film three-dimensional mesh fabric has steps of preparing a base cloth, preparing a mesh fabric, preparing a hot-melt film, providing the mesh fabric on the base cloth, providing the hot-melt film on the mesh fabric, heating, compressing and sagging a part of the hot-melt film into a plurality of grids and attaching the part to the base cloth so as to form a sagged portion and a plurality of insert holes, tearing off the base cloth, removing the sagged portion, and generating the film three-dimensional mesh fabric having the mesh fabric, a remaining part of the hot-melt film attached to the mesh fabric without sagging into the plurality of grids and without being attached to the base cloth and the plurality of insert holes corresponding to the plurality of grids and formed on the hot-melt film.

8 Claims, 6 Drawing Sheets

FILM THREE-DIMENSIONAL MESH FABRIC AND ITS MANUFACTURING METHOD

BACKGROUND OF THE INVENTION

1. Field of the Invention

This invention relates to a fabric manufacturing method, particularly to a film three-dimensional mesh fabric and its manufacturing method.

2. Description of the Prior Art

A conventional mesh fabric structure is generally made by having a plurality of yarns twisted together and then woven criss-cross in warp and weft direction, having a plurality of breathable grids formed among the woven threads, and such mesh fabric can be widely used for shoes, clothing and sporting goods. In addition, in order to cater to consumers who are particular about quality of life and styles for stimulating consumer's desire of purchase, the conventional mesh fabric structure usually carries out dyeing treatment after woven into shape for presenting colorful designs so as to attract attention of the consumers.

However, the conventional mesh fabric structure is to carry out dyeing treatment after woven into shape; therefore, its color saturation is of lower grade, its color is not full and the change of color is monotonous, thus unable to meet consumers' needs of innovation and variety. Further aside from unchanged color, the conventional mesh fabric structure is unable to increase other variability and functionality, such as variation of material or increase of reflection design. Therefore, the inventor of this invention observes the above-mentioned drawbacks and thinks that the conventional mesh fabric structure needs to be ameliorated and hence devises this invention.

SUMMARY OF THE INVENTION

The objective of this invention is to offer a film three-dimensional mesh fabric and its manufacturing method, able to have a mesh fabric additionally provided thereon with a hot-melt film by which the mesh fabric can enhance its variability and functionality of the mesh fabric.

The film three-dimensional mesh fabric in the present invention includes a mesh fabric having its surface provided with a plurality of grids. A hot-melt film is stuck to at least one side of the mesh fabric and provided with a plurality of insert holes at locations corresponding to the grids of the mesh fabric.

The manufacturing method of a film three-dimensional mesh fabric in the present invention includes the following steps: A first step is to prepare a base cloth having its surface provided with a mesh fabric, which has another side opposite to the base cloth provided with a hot-melt film, thus completing a first semi-finished product, wherein the mesh fabric has its surface formed with a plurality of grids. A second step is to have the first semi-finished product heated and compressed such that a portion of the hot-melt film, corresponding to the grid, sags into the grid and is tightly attached to the base cloth to form a sagged portion, such that the surface of the hot-melt film is formed into a plurality of insert holes corresponding with the shape of the grids, thus completing a second semi-finished product. A last step is to tear off the base cloth from the second semi-finished product and remove the sagged portion of the hot-melt film, which sags into the grid and stuck to the base cloth, such that the mesh fabric is formed thereon with the hot-melt film, which is provided with a plurality of insert holes at locations corresponding to the grids, thus completing a finished product of a film three-dimensional mesh fabric.

The film three-dimensional mesh fabric and its manufacturing method in the present invention is first to make a portion of the hot-melt film, which corresponds to the grid of the mesh fabric, sags into the grid and is stuck to the base cloth and then tears off the base cloth and remove the sagged portion that sags into the grid and is stuck to the base cloth, such that the mesh fabric is formed thereon with the hot-melt film, which is formed with a plurality of insert holes corresponding to the grids. By so designing, the mesh fabric can be additionally provided with the hot-melt film and retain its original grids and thus, the hot-melt film enables a user to carry out designs of variety of colors, materials and function for enhancing variability and functionality of the mesh fabric.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
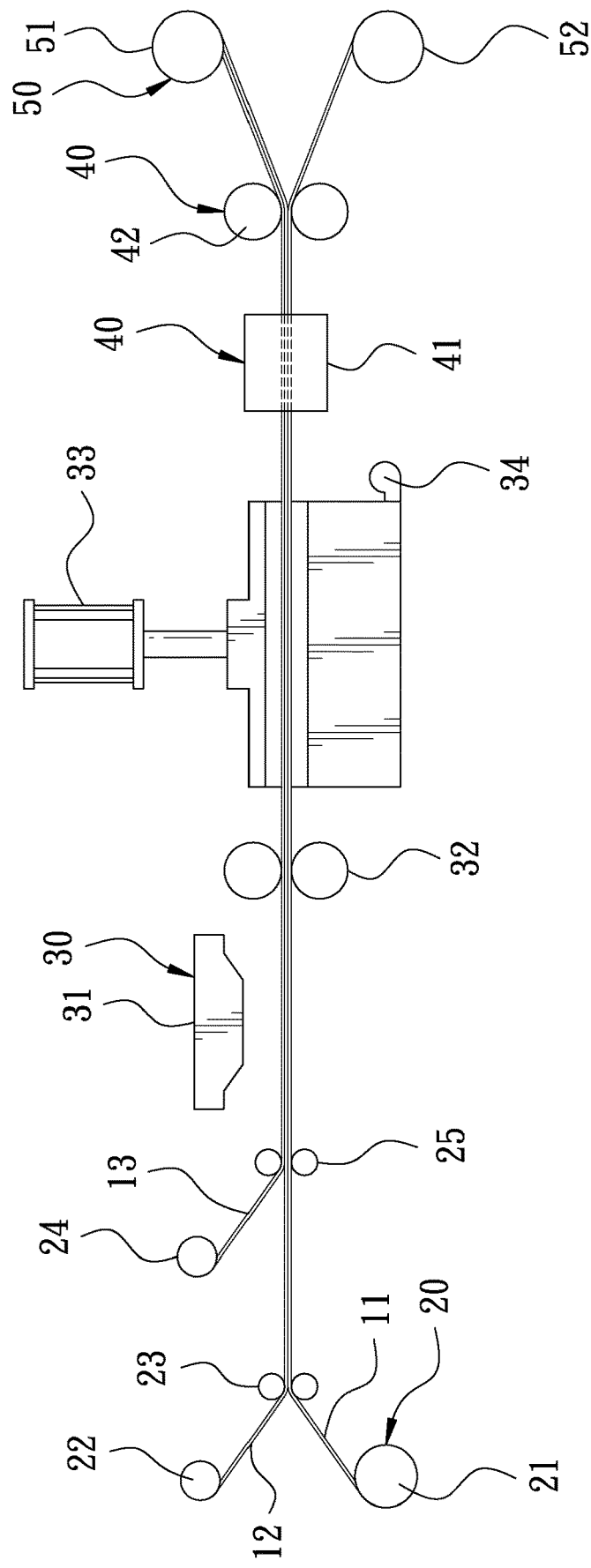
FIG. 1 is a manufacturing flow chart of a film three-dimensional mesh fabric in the present invention.
Figure 2:
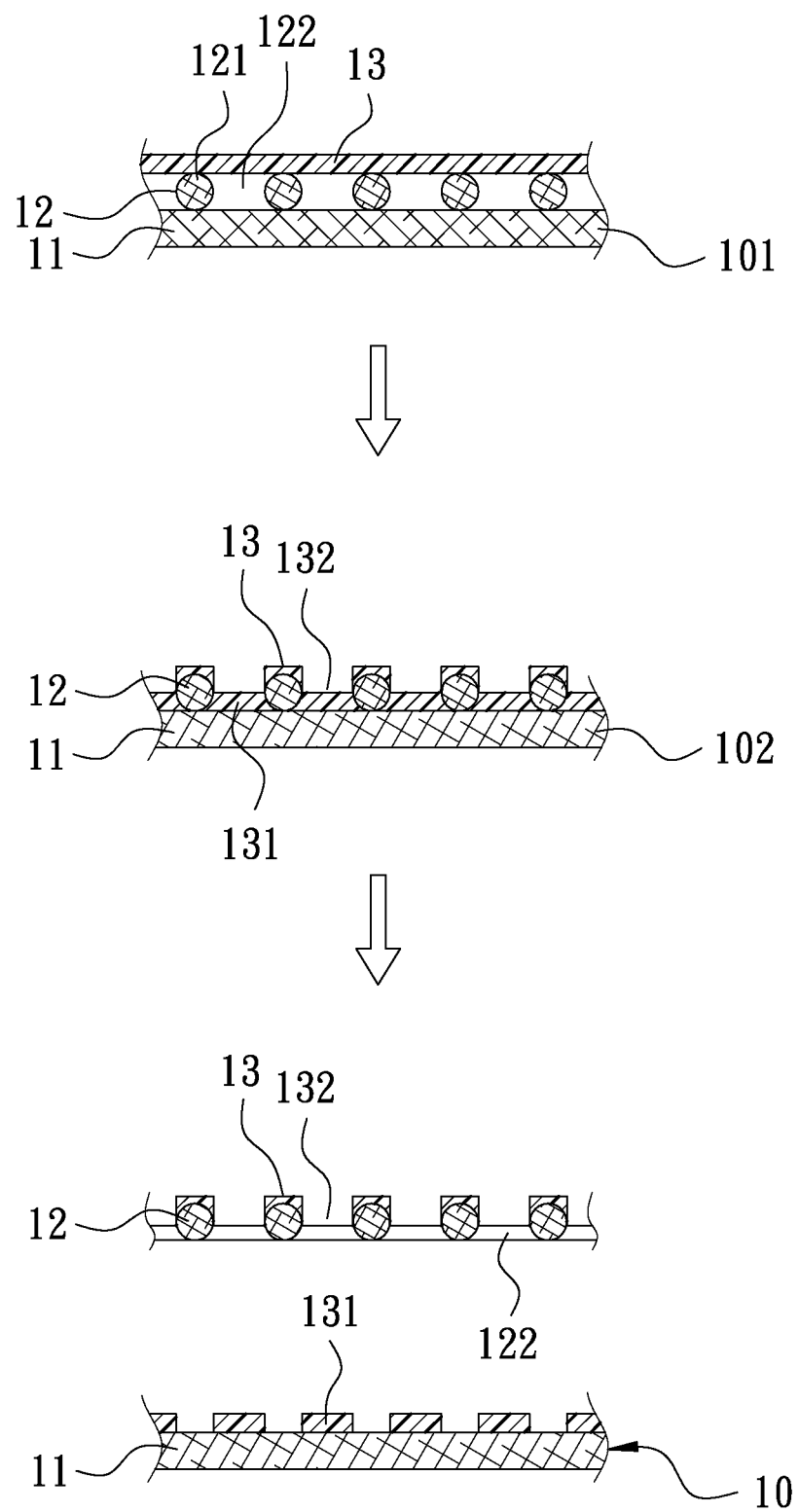
FIG. 2 is a schematic diagram of steps of manufacturing a finished product of the film three-dimensional mesh fabric in the present invention.

A preferred embodiment of a manufacturing method of a film three-dimensional mesh fabric 10 in the present invention, as shown in FIGS. 1 and 2, is orderly provided with a discharge unit 20, a hot-press unit 30, a cooling unit 40 and a collecting unit 50 arranged in a conveying direction, and includes the following steps:

A first step is to have a base cloth discharge wheel 21 discharging a base cloth 11 and have a mesh fabric discharge wheel 22 discharging a mesh fabric 12 and then employ a first auxiliary roller set 23 to have the mesh fabric 12 tightly attached to the base cloth 11 with a temperature of 20° C. to 60° C. Afterward, have a film discharge wheel 24 discharging a hot-melt film 13 and employ a second auxiliary roller set 25 to have the holt-melt film 13 tightly stuck to the mesh fabric 12 at one side opposite to the base cloth 11 with a temperature of 60 t to 180° C., thus completing a first semi-finished product 101. The base cloth 11 can adopt T/C cloth (tetoron/cotton cloth), tetoron, nelon, synthetic fiber, acrylic fiber, cotton, linen, silk, elastic fiber or non-woven fabric. The mesh fabric 12 is made by having a plurality of weaving threads 121 woven together, having a plurality of grids formed among the weaving threads 121, and the mesh fabric 12 can adopt tetoron, nelon, synthetic fiber, acrylic fiber, cotton, linen, silk, elastic fiber or non-woven fabric.

The hot-melt film 13 can adopt polyurethane, thermoplastic polyurethane, metal film, biaxial stretching polypropylene film, low density polyethylene film, nelon film, casting polypropylene film, polyvinyl chloride, polyethylene, polystyrene, polyester film, polypropylene, or nelon film.

A second step is to have the semi-finished product 101 blown with hot air by a hot air blower with a temperature of 40° C. to 200° C. for preheating and softening the hot-melt film 13 to attain effect of preliminary shaping and positioning and then carries out heating and pressurizing with a temperature of 60° C. to 180° C. A hot-press roller set 32 can be employed to carry out heating and pressurizing by having an upper roller and a lower roller rolled and pressed oppositely to carry out thermo-compression, or a hot-press forming mold 33 can be employed to carry out heating and pressurizing by having an upper mold and a lower mold pressed fit to carry out hot compression. Preferably, the hot-press roller set 32 is first employed to carry out hot compression for a first time and then has the hot-press forming mold 33 carrying out hot compression for a second time, and additionally has a vacuum pump 34 vacuumizing the hot-press forming mold 33, such that the pressure in the hot-press forming mold 33 maintains between -2 bar and 2 bar. Thus, a part of the hot-melt film 13, corresponding to the grids 122, will sags into the grids 122 and will be tightly attached to the base cloth 11 to form a sagged portion 131, such that the surface of the hot-melt film 13 forms a plurality of insert hole 132 corresponding with the shape of the grids 12 and thus completing a second semi-finished product 102.

A last step is to have the second semi-finished product 102 cooling off via a cooler 41 with a temperature of −40° C. to 30° C. and then employ a cooling clamping roller set 42 to have the second semi-finished product 102 conveyed to the collecting unit 50 to have a first finished product collecting wheel 51 rolling up the mesh fabric 12 and the hot-melt film 13 and employ a second finished product collecting wheel 52 to roll up the base cloth 11. Thus, the base cloth 11 is torn off from the second semi-finished product 102 and the sagged portion 131 sagging in the grids 122 and stuck to the base cloth 11 is removed, such that the mesh fabric 12 is formed thereon with the holt-melt film 13, which is formed with the insert holes 132 corresponding to the grids 122, thus completing a finished product of a film three dimensional mesh fabric 10.

Figure 3:
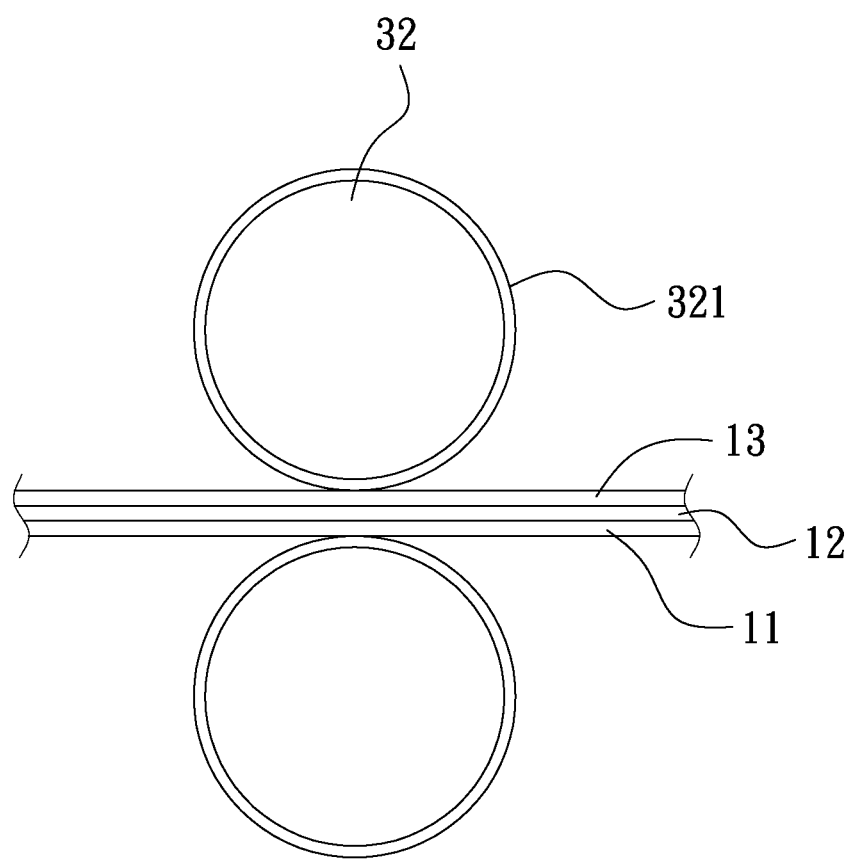
FIG. 3 is a schematic diagram of a hot press roller set in the present invention.
Figure 4:
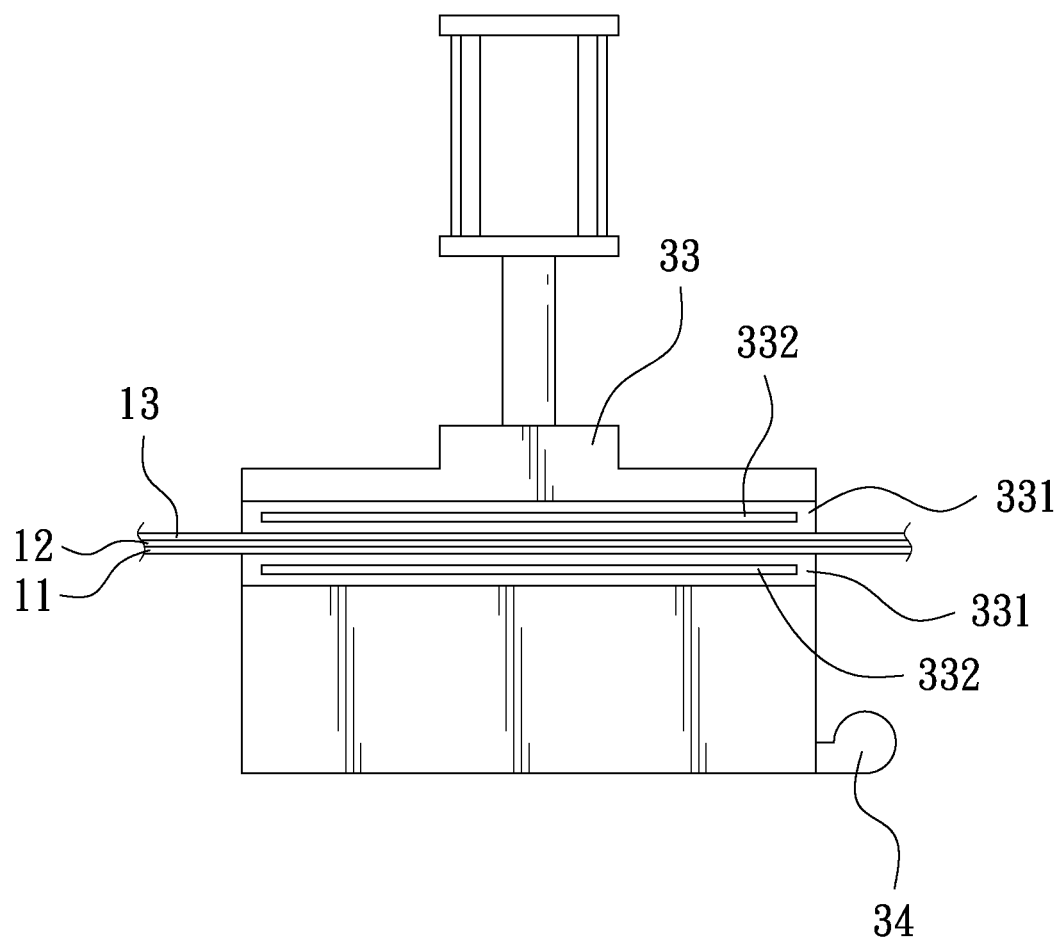
FIG. 4 is a schematic diagram of a hot press forming mold in the present invention.

Referring to FIGS. 3 and 4, the hot-press roller set 32 has its surface annularly provided with a wheel sticking soft pad 321, while the hot-press forming mold 33 has an upper side and a lower side respectively provided with a mold soft pad 331 corresponding to the first semi-finished product 101, and a silica gel soft pad 332 is sandwiched in each mold soft pad 331. By so designing, when the hot-press roller set 32 and the hot-press forming mold 33 carry out thermo-compression to the first semi-finished product 101, the wheel sticking soft pad 321 and the mold soft pad 331, which are able to be deformed elastically, can really have the portions of the hot-melt film 13, corresponding to the grids 122, compressed in the grids 122. Thus, not only the shape of the grids 122 can be completely presented, but also the locations of the hot-melt film 13, which correspond to the woven threads 121 of the mesh fabric 12, can be compressed to present the original patterns of the woven threads 121, and the above-mentioned effects will become more evident if the vacuum pump 34 can be additionally employed to carry out vacuumization.

Figure 5:
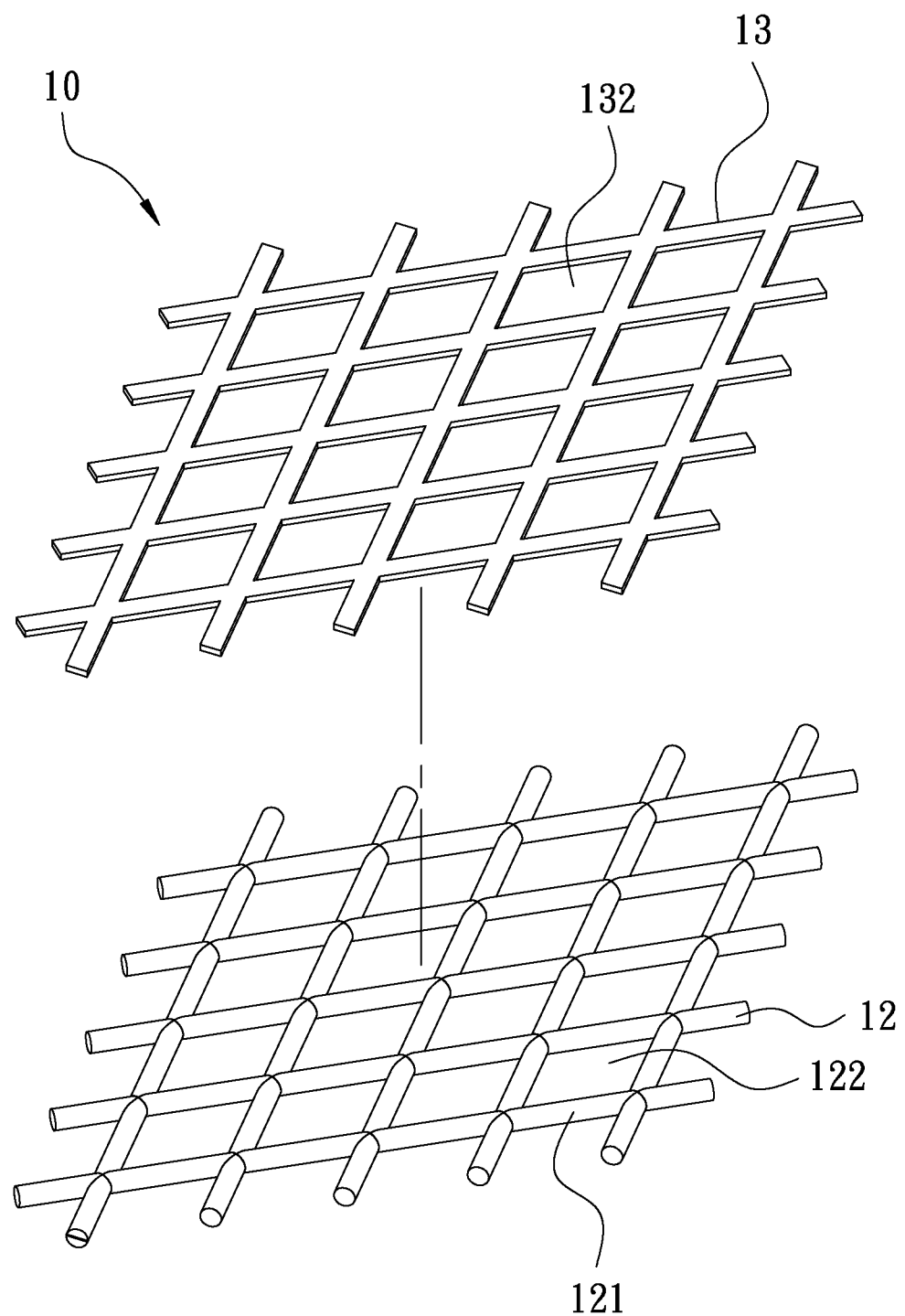
FIG. 5 is an exploded perspective diagram of a finished product of the film three-dimensional mesh fabric in the present invention.
Figure 6:
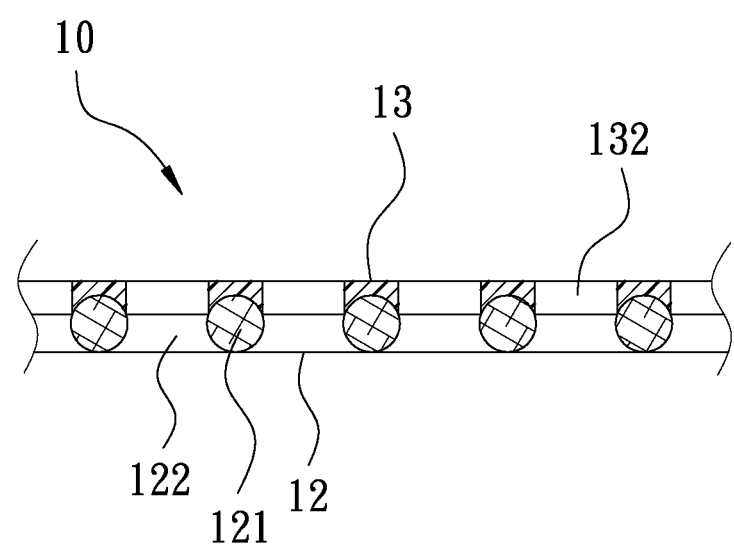
FIG. 6 is a cross-sectional diagram of the finished product of the film three-dimensional mesh fabric in the present invention.

Referring to FIGS. 5 and 6, the film three-dimensional mesh fabric 10 manufactured through above-mentioned manufacturing method contains the mesh fabric 12 having its surface formed with a plurality of grids 122 and having at least one side stuck with the hot-melt film 13, which is provided with a plurality of insert holes 132 corresponding with the grids 122. By so designing, the mesh fabric 12 can be additionally provided thereon with the hot-melt film 13 and retains the original grids 122 of the mesh fabric 12 and thus, a user can carry out design in variety of colors, material and function via the hot-melt film 13 for enhancing changeability and functionality of the mesh fabric 12. For instance, the hot-melt film 13 can be designed to form metal pattern for building decoration changes of different materials, or the hot-melt film 13 can be a reflective material to render the film three-dimensional mesh fabric formed with reflective functionality.

Referring to FIG. 2, one special feature of this invention is that the base cloth 11 torn off from the second semi-finished product 102 and rolled up by the second finished product collecting wheel 52 has its surface retaining the sagged portions 131 that sag into the grids 122 and tightly attached to the base cloth 11, such that the surface of the base cloth 11 is formed into three-dimensional patterns corresponding with the arrangement and shape of the grids 122 to enable the base cloth 11 to be recycled and re-used for article decoration, such as shoes, clothing or handbags. Therefore, the manufacturing method of a film three-dimensional mesh fabric of this invention is able to fully make use of all the materials and has environmental protection and economic benefits.

While the preferred embodiment of the invention has been described above, it will be recognized and understood that various modifications may be made therein and the appended claims are intended to cover all such modifications that may fall within the spirit and scope of the invention.

What is claimed is:

1. A method of manufacturing a film three-dimensional mesh fabric comprising:

preparing a base cloth with a surface, preparing a mesh fabric with a first side and a second side opposite to each other and with a plurality of grids, preparing a hot-melt film, providing the second side of the mesh fabric on the surface of the base cloth, providing the hot-melt film on the first side of the mesh fabric, thereby generating a first semi-finished product of a film three-dimensional mesh fabric;

heating and compressing the first semi-finished product of the film three-dimensional mesh fabric, such that a part of the hot-melt film, which corresponds to the plurality of grids, sags into the plurality of grids and is tightly attached to the base cloth so as to form a sagged portion and so as to form a plurality of insert holes corresponding to the plurality of grids on the hot-melt film, and such that a remaining part of the hot-melt film is attached to the first side of the mesh fabric without sagging into the plurality of grids and without being attached to the base cloth, thereby generating a second semi-finished product of the film three-dimensional mesh fabric; and tearing off the base cloth and removing the sagged portion that sags into the plurality of grids and is stuck to the base cloth from the second semi-finished product of the film three-dimensional mesh fabric, thereby generating a finished product of the film three-dimensional mesh fabric, the finished product of the film three-dimensional mesh fabric comprising the mesh fabric, the remaining part of the hot-melt film attached to the first side of the mesh fabric without sagging into the plurality of grids and without being attached to the base cloth, and the plurality of insert holes corresponding to the plurality of grids and formed on the hot-melt film.

2. The method as claimed in claim 1, wherein the mesh fabric is tightly attached to the base cloth at a temperature of 20° C. to 60° C., and the hot-melt film is firmly stuck to the mesh fabric at a temperature of 60° C. to 180° C.

3. The method as claimed in claim 1, wherein the first semi-finished product of the film three-dimensional mesh fabric is preheated and softened at a temperature of 40° C. to 200° C. and then thermo-compressed at a temperature of 60° C. to 180° C.

4. The method as claimed in claim 1, wherein the first semi-finished product of the film three-dimensional mesh fabric is hot compressed by a hot-press roller set having an upper roller and a lower roller, the hot-press roller set having a surface with an annular pad.

5. The method as claimed in claim 1, wherein the first semi-finished product of the film three-dimensional mesh fabric is hot compressed by a hot-press forming mold having an upper mold and a lower mold, the hot-press forming mold having an upper side and a lower side respectively provided with a mold pad and a silica gel pad corresponding to the first semi-finished product of the film three-dimensional mesh fabric, the silica gel pad being embedded in the mold pad.

6. The method as claimed in claim 5, wherein the hot-press forming mold is further connected with a vacuum pump for carrying out vacuumization to the hot-press forming mold, and the pressure in the hot-press forming mold maintains a range between −2 bar and 2 bar during the vacuumization.

7. The method as claimed in claim 1, wherein the second semi-finished product of the film three-dimensional mesh fabric is cooled at a temperature of −40° C. to 30° C. and the base cloth is torn off.

8. The method as claimed in claim 1, wherein the hot-melt film is a reflective material.

* * * * *